(12) United States Patent
Shoji et al.

(10) Patent No.: US 7,570,551 B2
(45) Date of Patent: Aug. 4, 2009

(54) SERVO POSITION ADJUSTMENT METHOD AND SERVO POSITION ADJUSTMENT DEVICE

(75) Inventors: Mamoru Shoji, Osaka (JP); Yuuichi Kuze, Osaka (JP); Takahiro Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 300 days.

(21) Appl. No.: 10/587,483

(22) PCT Filed: Dec. 9, 2004

(86) PCT No.: PCT/JP2004/018345

§ 371 (c)(1),
(2), (4) Date: Jul. 27, 2006

(87) PCT Pub. No.: WO2005/073963

PCT Pub. Date: Aug. 11, 2005

(65) Prior Publication Data

US 2007/0171783 A1 Jul. 26, 2007

(30) Foreign Application Priority Data

Jan. 28, 2004 (JP) ............................. 2004-019581

(51) Int. Cl.
*G11B 7/00* (2006.01)
(52) U.S. Cl. ................... 369/44.31; 369/47.53
(58) Field of Classification Search ............... None
See application file for complete search history.

(56) References Cited

U.S. PATENT DOCUMENTS

| 5,590,111 | A | 12/1996 | Kirino et al. |
| 5,732,061 | A | 3/1998 | Kirino et al. |
| 6,438,078 | B2 * | 8/2002 | Yamazaki et al. ........ 369/44.29 |
| 6,731,573 | B2 * | 5/2004 | Takeda .................... 369/44.29 |
| 7,227,818 | B1 * | 6/2007 | Toda et al. ............... 369/44.29 |
| 7,355,957 | B2 * | 4/2008 | Yamanaka et al. ........ 369/275.4 |
| 2003/0067998 | A1 | 4/2003 | Nakajima et al. |
| 2003/0107961 | A1 | 6/2003 | Yasuda et al. |
| 2005/0063259 | A1 | 3/2005 | Isshiki et al. |
| 2005/0088930 | A1 | 4/2005 | Minechika et al. |

FOREIGN PATENT DOCUMENTS

CN 1399265 2/2003

(Continued)

OTHER PUBLICATIONS

European Search Report issued Apr. 24, 2008 in the corresponding European application No. EP 04 82 1245.

(Continued)

*Primary Examiner*—Peter Vincent Agustin
(74) *Attorney, Agent, or Firm*—Wenderoth, Lind & Ponack, L.L.P.

(57) ABSTRACT

It is an object of the present invention to provide a method for absorbing individual variance between optical disc devices or optical discs, and for determining the optimal servo adjustment position even with optical discs in which no convex/concave pit string is present. When mounting a disc, servo position adjustment is performed in at least two stages: first servo position adjustment and second servo position adjustment. Also, the second servo position adjustment is performed by recording a predetermined signal after the first servo position adjustment and reproducing the track where the predetermined signal was recorded.

9 Claims, 15 Drawing Sheets

FOREIGN PATENT DOCUMENTS

| | | |
|---|---|---|
| EP | 0 001 307 | 4/1979 |
| EP | 1 355 300 | 10/2003 |
| EP | 1 318 507 | 10/2007 |
| JP | 4-141831 | 5/1992 |
| JP | 6-84173 | 3/1994 |
| JP | 7-201059 | 8/1995 |
| JP | 8-7278 | 1/1996 |
| JP | 2000-331364 | 11/2000 |
| JP | 2002-216369 | 8/2002 |
| JP | 2003-141823 | 5/2003 |
| JP | 2003-233917 | 8/2003 |
| JP | 2004-095106 | 3/2004 |
| JP | 2004-241080 | 8/2004 |

OTHER PUBLICATIONS

European Office Action issued Sep. 3, 2008 in connection with EP 04 821 245 corresponding to the present U.S. application.

Chinese Office Action (with English translation) issued Oct. 10, 2008 in connection with Chinese application No. 200480041001.5 corresponding to the present application.

\* cited by examiner

SERVO POSITION ADJUSTMENT METHOD AND SERVO POSITION ADJUSTMENT DEVICE

BACKGROUND OF THE INVENTION

1. Technical Field

The present invention relates to a servo position adjustment method and a servo position adjustment device used for recording optical information to a recordable information recording medium.

2. Background Art

With optical disc devices that record digital information to an optical disc by irradiation with a laser beam, there may be differences between individual devices or recording media, and these can lower the quality of recording and reproduction signals.

To prevent signal quality from being diminished by these individual differences, servo position adjustment is performed during the installation of the recording medium, and the system searches for the servo position that is ideal for the specific optical disc device or recording medium.

FIG. 7 shows the structure of an optical disc in an example of prior art. In FIG. 7, 701 is an optical disc, 702 is a track, and 703 is a convex/concave pit.

As shown in FIG. 7, the optical disc 701 has a plurality of groove-shaped tracks 702 formed in a spiral shape, and the tracks 702 are irradiated with an optical beam to record marks and user data in the spaces between the marks.

Disc information, such as the recording capacity of the optical disc or the irradiation power during recording, is recorded in the convex/concave pits 703. In the past, in the recording of user data, first the convex/concave pit region would be reproduced and the servo position adjusted. For example, in the adjustment of focal position, every time the focal position is changed, a convex/concave pit string 703 is reproduced to acquire a jitter value, and the focal position that gives the lowest jitter value is selected. In the adjustment of the lens tilt position, every time the lens tilt position is changed, the convex/concave pit string 703 is reproduced to acquire a jitter value, and the lens tilt position that gives the lowest jitter value is selected. The above servo position adjustment is the same in the case of a reproduction-only disc whose entire surface is covered by convex/concave pits.

Patent Document 1: Japanese Laid-Open Patent Application H8-45081

BRIEF SUMMARY OF THE INVENTION

Problems Which the Invention is Intended to Solve

However, with a Blu-Ray Disc (BD), for example, disc information is formed by changing the wavy shape of the tracks. With an optical disc such as this in which no convex/concave pits 702 are formed, accurately determining the servo adjustment position is difficult with the prior art.

In light of the above situation, it is an object of the present invention to provide a servo position adjustment method and a servo position adjustment device for determining the optimal servo adjustment position even with optical discs in which no convex/concave pit string is present.

Means Used to Solve the Above-Mentioned Problems

To achieve the stated object, the servo position adjustment method of the present invention is a method for recording to an information recording medium in which a plurality of tracks are formed concentrically or spirally, and the recording side of the tracks is irradiated with an optical beam to record user data in marks and the spaces between marks, comprising a first servo position adjustment step, a recording step, and a second servo position adjustment step. In the recording step, a predetermined signal is recorded after a first servo position adjustment. In the second servo position adjustment step, a second servo position adjustment is performed by reproducing the track where the predetermined signal was recorded.

With the present invention, servo position adjustment is performed in at least two stages: first servo position adjustment and second servo position adjustment. Also, the second servo position adjustment is performed by recording a predetermined signal after first servo position adjustment and then reproducing the track where the predetermined signal was recorded. As a result, even when recording to an optical disc in which no convex/concave pit string is present, individual variance between optical disc devices or optical discs can be absorbed and the correct servo adjustment position determined, and user data can be correctly recorded.

Also, the first servo position adjustment step and the second servo position adjustment step are steps of adjusting a servo position on the basis of different evaluation indices.

The first servo position adjustment step is a step of adjusting the servo position so as to optimize an evaluation index with respect to tracking error.

For instance, the servo position is adjusted to near the position of the maximum differential component of two signals outputted from a light receiving element disposed such that a light beam is split in two by a dividing line in the track direction.

Also, the second servo position adjustment step is a step of adjusting a servo position so as to optimize an evaluation index with respect to a reproduction signal in a predetermined reproduction signal processing method.

The "predetermined reproduction signal processing method" here is, for example, a reproduction signal processing method used when reproducing recorded user data.

With the present invention, the servo position that is ultimately obtained is the position that is optimal for reproducing or recording signals. This makes it possible to record user data even more accurately.

Also, the second servo position adjustment step is a step of adjusting a servo position so as to minimize a PRML error index M.

With the present invention, using a PRML method is particularly effective when user data is being reproduced.

Also, at least one of adjustments of focal position, lens tilt position, and spherical aberration position is performed in the first servo position adjustment step or the second servo position adjustment step.

Also, recording conditions in the recording step are determined by test recording.

With the present invention, recording is suitably performed in the recording step. Accordingly, the second servo position adjustment, which is performed by reproducing a recorded track, is carried out more favorably.

Also, the recording conditions include conditions for pulse position and/or laser irradiation power in recording the predetermined signal.

For instance, pulse position and/or irradiation power is determined in the course of irradiating the recording side of a track with an optical beam using a plurality of drive pulses adjusted in number according to the length of the mark portion of the original signal.

The servo position adjustment device of the present invention is a servo position adjustment device for adjusting a servo position in the course of recording to an information recording medium, in which a plurality of tracks are formed concentrically or spirally, and the recording side of the tracks is irradiated with an optical beam to record user data in marks and the spaces between marks, comprising a first servo position adjustment unit, a recording unit, and a second servo position adjustment unit. The recording unit is for recording a predetermined signal after a first servo position adjustment. The second servo position adjustment unit is for performing a second servo position adjustment by reproducing the track where the predetermined signal was recorded.

With the present invention, servo position adjustment is performed in at least two stages: first servo position adjustment and second servo position adjustment. Also, the second servo position adjustment is performed by recording a predetermined signal after first servo position adjustment and then reproducing the track where the predetermined signal was recorded. As a result, even when recording to an optical disc in which no convex/concave pit string is present, individual variance between optical disc devices or optical discs can be absorbed and the correct servo adjustment position determined, and user data can be correctly recorded.

EFFECT OF THE INVENTION

With the servo position adjustment method of the present invention, servo position adjustment is performed in at least two stages: first servo position adjustment and second servo position adjustment. With the servo position adjustment method of the present invention, the second servo position adjustment is performed by recording a predetermined signal after the first servo position adjustment and then reproducing the track where the predetermined signal was recorded. As a result, even when recording to an optical disc in which no convex/concave pit string is present, individual variance between optical disc devices or optical discs can be absorbed and the correct servo adjustment position determined, and user data can be correctly recorded.

Figure 1:
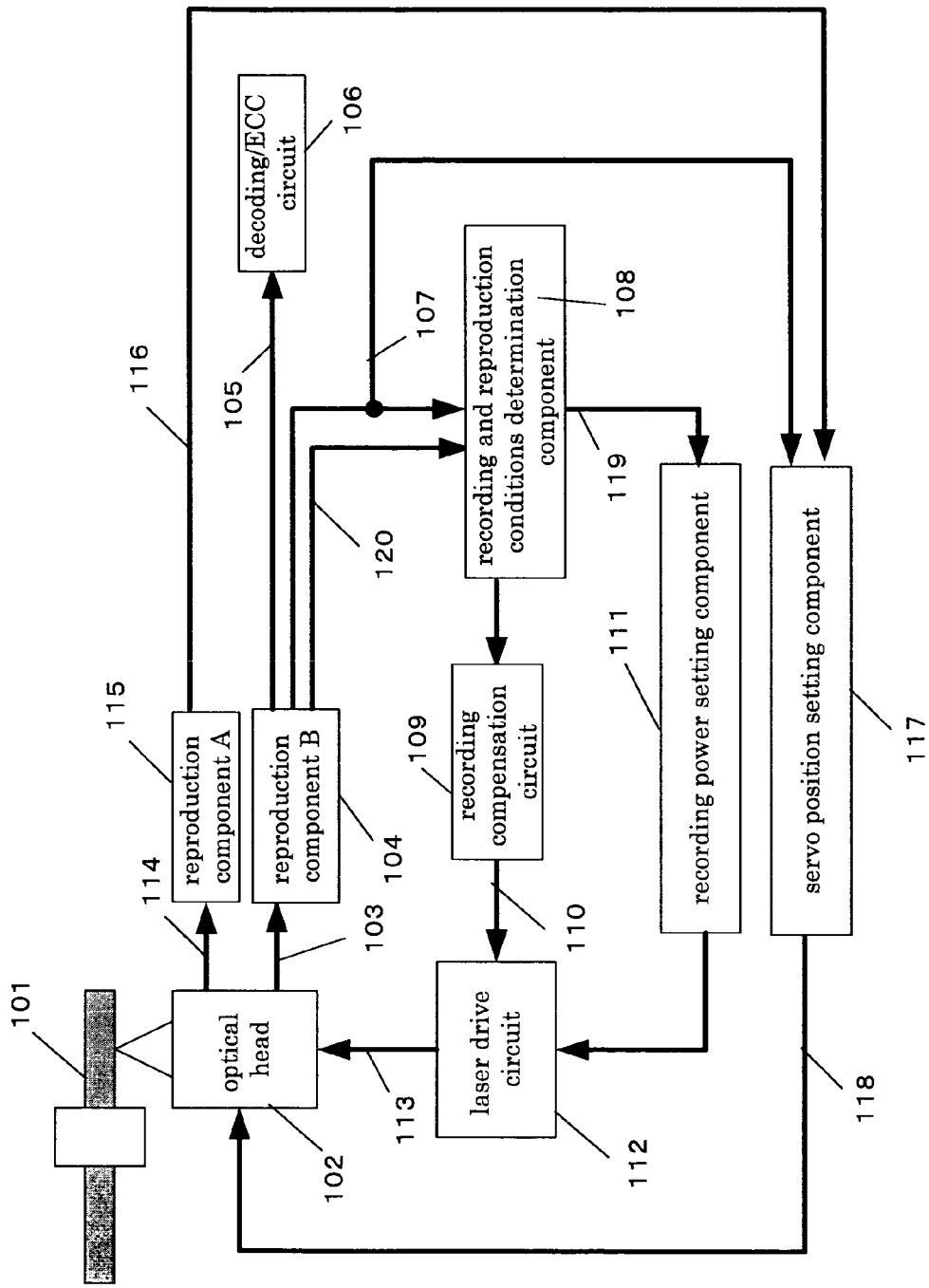
FIG. 1 is a block diagram of the optical disc device in an embodiment of the present invention.

KEY 101 optical disc
102 optical head
104 reproduction component B
108 recording and reproduction conditions determination component
109 recording compensation circuit
112 laser drive circuit
111 recording power setting component
115 reproduction component A
117 servo position setting component
201 pre-amplifier
204 waveform equalizer
205 A/D converter
206 digital filter
207 Viterbi decoder
208 differential metric analyzer
601 groove track
701 optical disc
702 track
703 convex/concave pit
1004 computer

DETAILED DESCRIPTION OF THE INVENTION

Preferred embodiments of the present invention will now be described with reference to the drawings.

Structure

FIG. 1 shows the structure of the optical disc device in an embodiment of the present invention. In FIG. 1, 101 is an optical disc, 102 is an optical head, 104 is a reproduction component B, 106 is a decoding/ECC circuit, 108 is a recording and reproduction conditions determination component, 109 is a recording compensation circuit, 111 is a recording power setting component, 112 is a laser drive circuit, 115 is a reproduction component A, and 117 is a servo position setting component.

Figure 11:
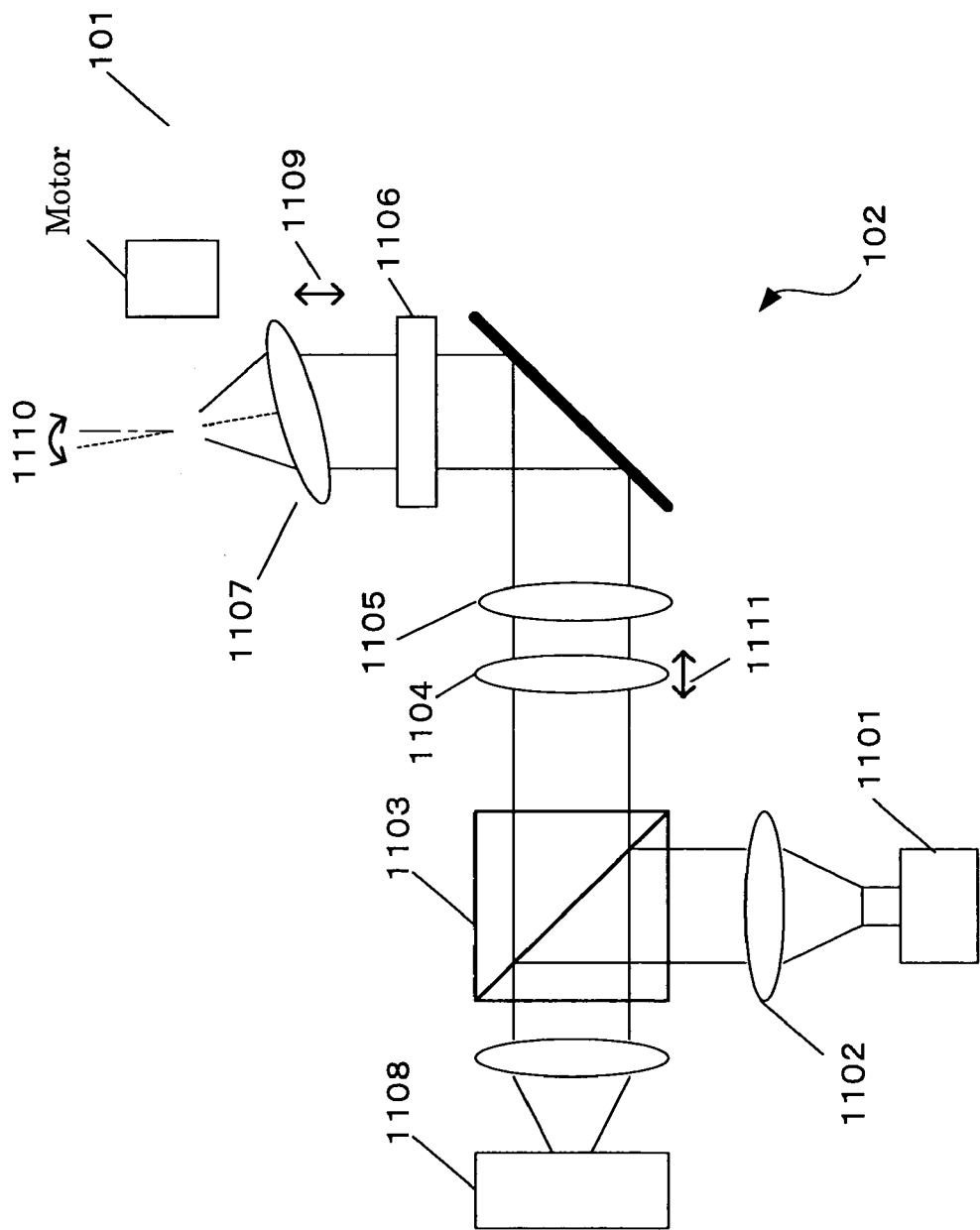
FIG. 11 is a diagram of the structure of the optical head of the present invention.

FIG. 11 shows the structure of the optical head 102. In FIG. 11, 1101 is a semiconductor laser, 1102 is a collimating lens, 1103 is a beam splitter, 1104 is a convex lens, 1105 is a concave lens, 1106 is a quarter wave plate, 1107 is an objective lens, and 1108 is a PIN photodiode.

Figure 6:
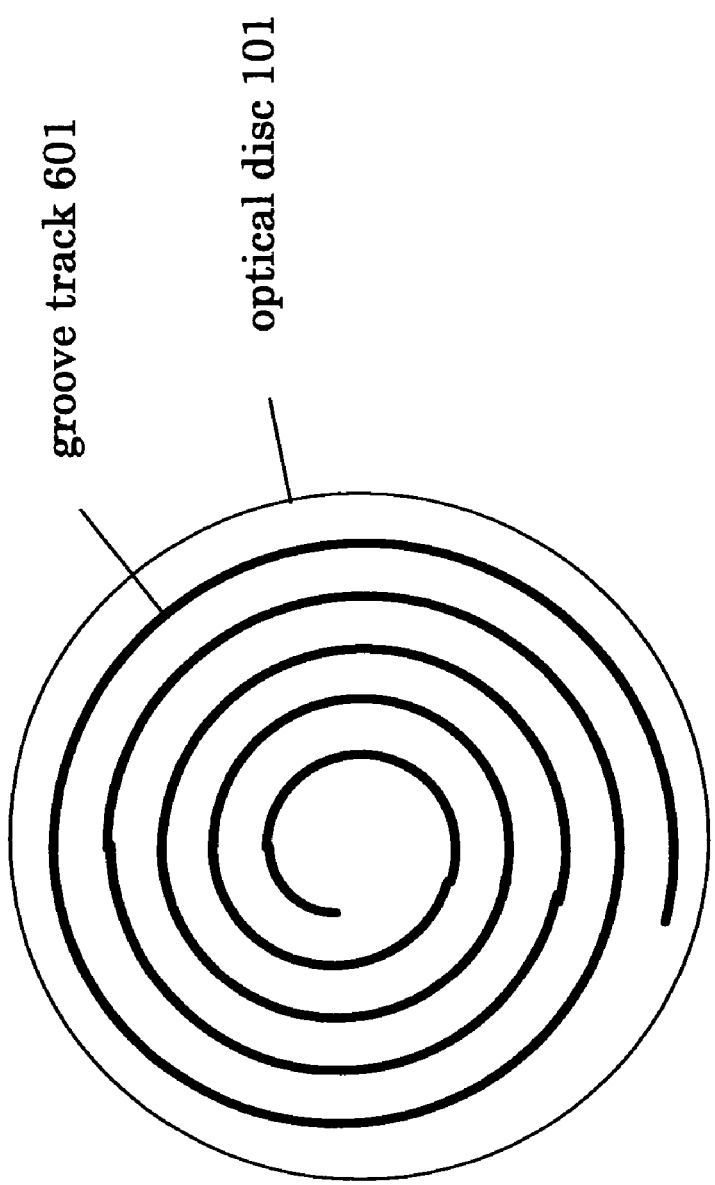
FIG. 6 is a plan view of the optical disc in an embodiment of the present invention.
Figure 7:
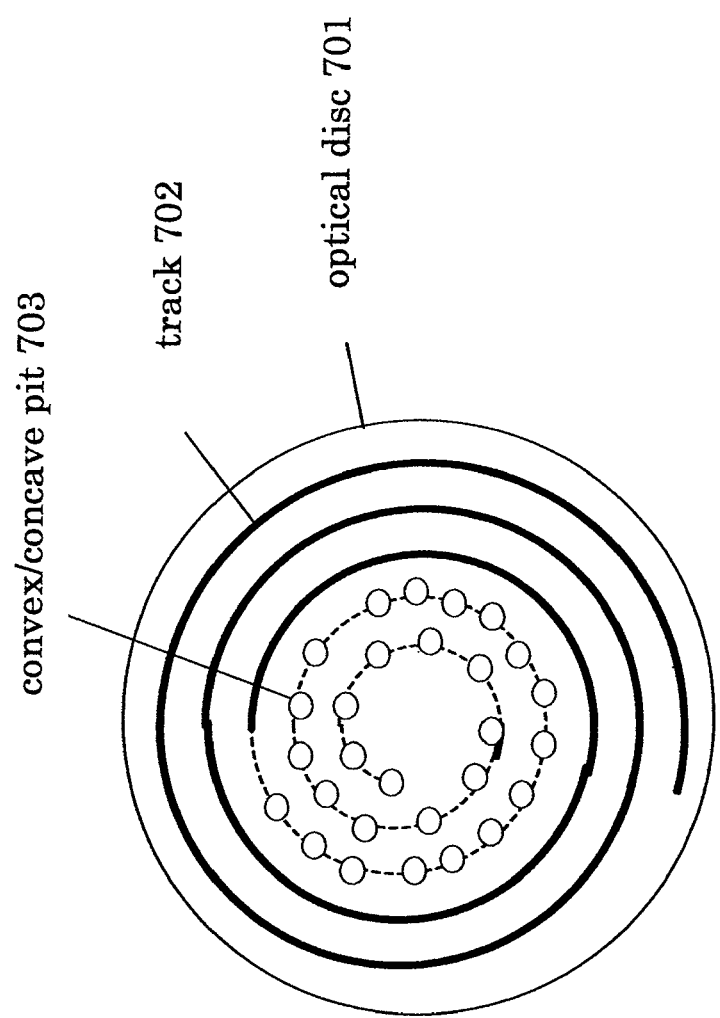
FIG. 7 is a plan view of a conventional optical disc.

FIG. 6 shows the track structure of the optical disc 101 in this embodiment. The optical disc 101 has a recording region in the groove track 601, and this groove track is formed in a continuous spiral pattern. The structure of the disc is not limited to this, however, and a plurality of tracks may instead be formed concentrically.

Operation

Before the structure of the optical disc device and the operation thereof are described in further detail, the basic concept of the servo position adjustment method of the present invention will be described through reference to a flowchart.

Figure 12:
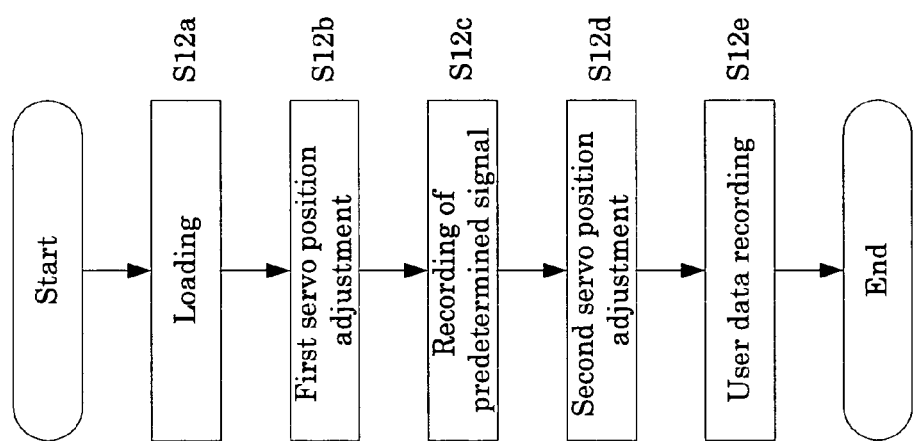
FIG. 12 is a flowchart in an embodiment of the present invention.

FIG. 12 is a flowchart illustrating the servo position adjustment method of the present invention. Step S12a is a loading step, in which an installed disc is loaded. Step S12b is a first servo position adjustment step. Step S12c is a recording step, in which a predetermined signal is recorded. Step S12d is a second servo position adjustment step, in which a second servo position adjustment is performed by reproducing the track where the predetermined signal was recorded. Step S12e is a user data recording step, in which user data is recorded at the servo positions set in steps S12a to S12d.

The structure of the optical disc device and the operation thereof will now be described in further detail, and the steps shown in FIG. 12 will also be described in detail. The user data recording step is not unique to the present invention, and will therefore not be described in detail here.

Loading Step Once the optical disc 101 has been installed in the optical disc device and predetermined operations such as identifying the type of disc and rotation control have been completed, the optical head 102 moves to the test region for setting the optimal recording power. The "test region" here refers to a region other than the user region where the user records data, and is provided around the outermost or innermost periphery of the disc.

First Servo Position Adjustment Step

The method for adjusting the first servo position will now be described. The optical head 102 reproduces the test region in a state in which the tracking servo is moved away. An output signal 114 from the optical head is inputted to the reproduction component A 115.

Figure 10:
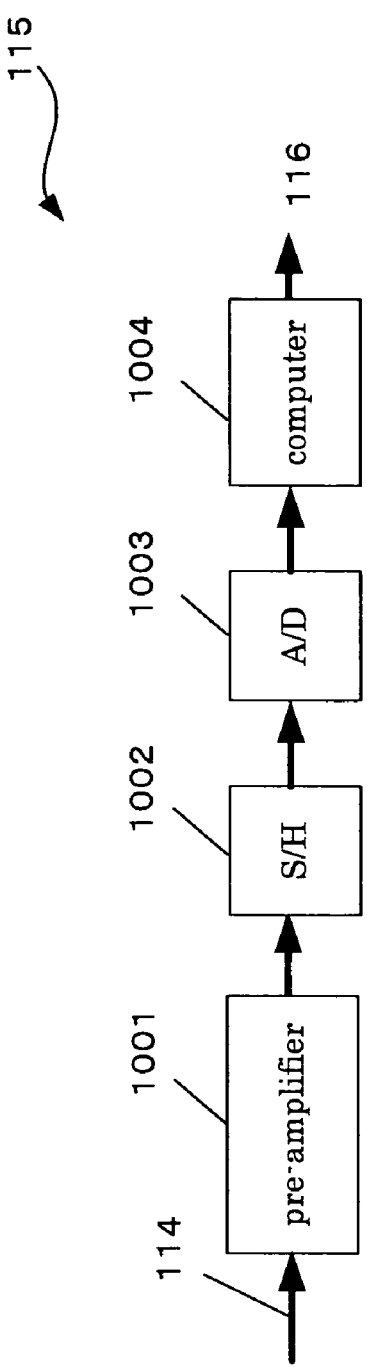
FIG. 10 is a block diagram of the reproduction component in an embodiment of the present invention.

FIG. 10 is a block diagram of the reproduction component A 115. In FIG. 10, 1001 is a pre-amplifier, 1002 is a sample/hold circuit, and 1003 is an A/D converter. The output signal 114 here is a tracking error signal, and is the differential component of two signals outputted from a light receiving element disposed such that a light beam is split in two by a dividing line in the track direction.

The output signal 114 is amplified by the pre-amplifier 1001, the peak and bottom values are held by the sample/hold circuit 1002 and converted into digital values by the A/D converter 1003, and the difference between the peak and bottom values is calculated by the computer 1004. As a result, a signal 116 corresponding to the amplitude of the tracking error signal is inputted to the servo position setting component 117.

The servo position setting component 117 outputs a signal 118 for changing the focal position 1109 of the optical head 102. The servo position setting component 117 acquires at every focal position the signal 116 corresponding to the amplitude of the tracking error signal, and determines the focal position at which the tracking error signal is at its maximum.

Similarly, the servo position setting component 117 outputs the signal 118 for changing the lens tilt position 1110 of the optical head 102. The servo position setting component 117 acquires at every lens tilt position the signal 116 corresponding to the amplitude of the tracking error signal, and determines the lens tilt position at which the tracking error signal is at its maximum. The "lens tilt position" here is the tilt of the objective lens 1107, and in particular is the amount of tilt for correcting tilt of the disc in the radial direction.

With a multilayer disc such as a BD, spherical aberration occurs when switching between layers, so the spherical aberration position has to be adjusted. Here again, the servo position setting component 117 outputs the signal 118 for changing the spherical aberration position 1111 of the optical head 102. The servo position setting component 117 acquires at every spherical aberration position the signal 116 corresponding to the amplitude of the tracking error signal, and determines the spherical aberration position at which the tracking error signal is at its maximum.

The servo position setting component 117 performs adjustment of the above-mentioned focal position, lens tilt position, or spherical aberration position, or may perform any two of these adjustments, or all of them.

In this embodiment, the way the spherical aberration position is changed is to change the position 1111 of the convex lens 1104 by using a spherical aberration position correction component constituted by the convex lens 1104 and the concave lens 1105, but the method for changing the spherical aberration position need not be limited to this.

Because the focal position and the spherical aberration position are in a mutually dependent relationship, the tracking error signal may be acquired while the focal position and spherical aberration position are dispersed in the form of a two-dimensional map, for example. This will be described through reference to FIG. 13.

Figure 13:
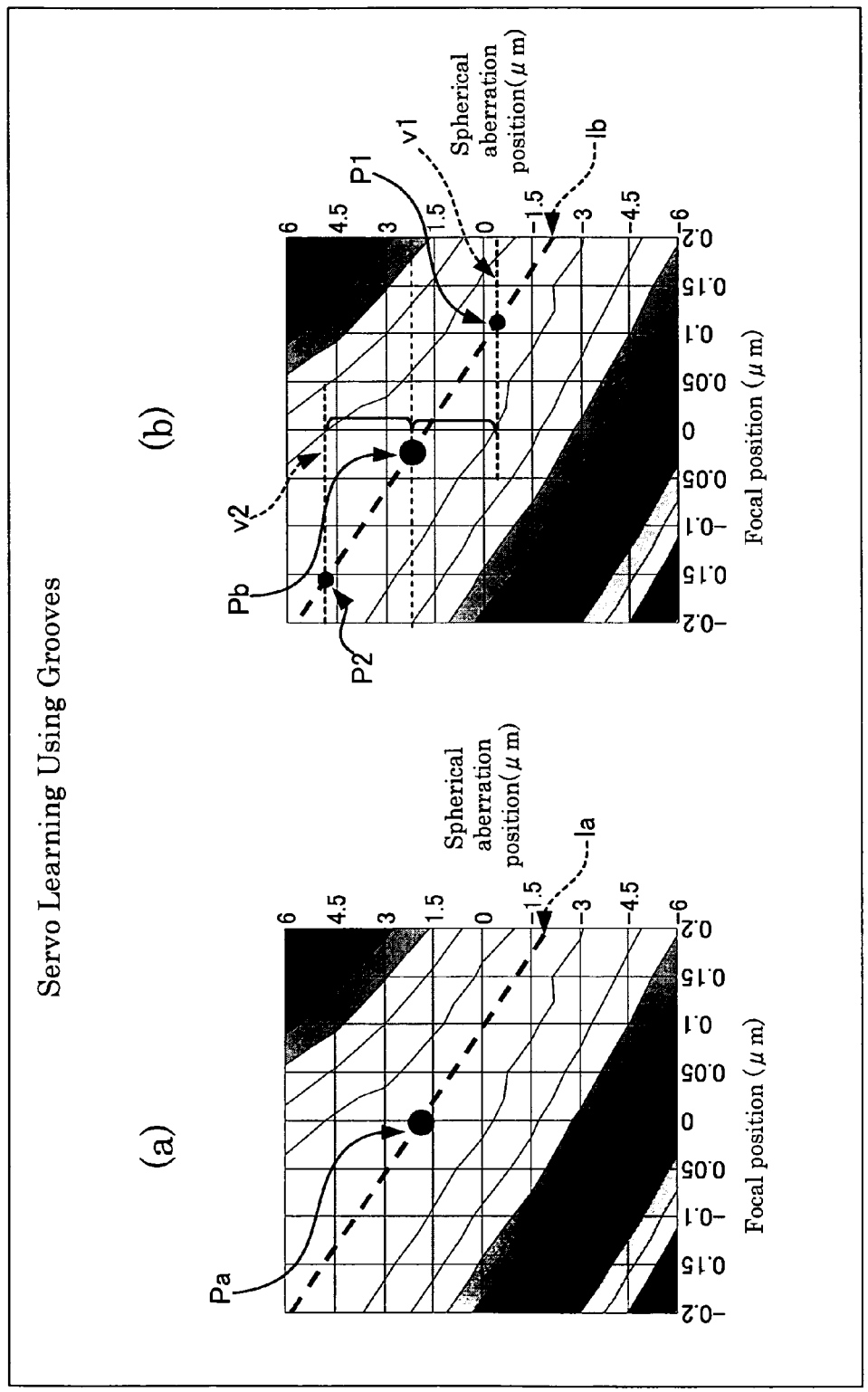
FIG. 13 consists of graphs of servo position measurement when a tracking error signal is used as an evaluation index in an embodiment of the present invention.

FIG. 13 consists of graphs showing by contours the distribution of the value of the tracking error signal (amplitude of tracking error signal) versus the focal position and spherical aberration position. Specifically, the tracking error signal is measured while varying the focal position and the spherical aberration position, and the distribution thereof is shown by contours. In FIG. 13, there is a portion near the center (the ridge portion of the contours) where the value of the tracking error signal becomes larger from the upper left toward the lower right in the graph, and the value of the tracking error signal becomes smaller from near the center toward the upper right and the lower left.

The servo position setting component 117 searches for the optimal values for the focal position and spherical aberration position on the basis of the distributions in FIG. 13.

This search for the optimal values will be described through reference to FIG. 13a. The servo position setting component 117 measures the amplitude of the tracking error signal while varying the focal position and spherical aberration position (procedure 1). Also, the line passing through the place where the amplitude of the tracking error signal is largest is approximated (see approximation line 1a) (procedure 2). Further, the spherical aberration position when the focal position is at a predetermined initial value is found on the approximation line 1a, and the focal position and spherical aberration position at this point are termed the optimal servo position Pa (procedure 3). The initial value of the focal position set in procedure 3 is a value preset at the optical disc device factory, for example, and is set to 0 μm in FIG. 13a.

Procedures 2 and 3 may be as follows. This will be described through reference to FIG. 13b. In procedure 2'-1, the range of the spherical aberration position at which the tracking error signal value becomes larger is found (value v1 to value v2) for when the focal position is a predetermined initial value (0 μm in FIG. 13b). Procedure 2'-2 involves searching for the focal positions at which the tracking error signal is at its largest in the spherical aberration position v1 and the spherical aberration position v2 (points p1 and p2). In procedure 2'-3, the line linking point p1 and point p2 is termed the line that passes through where the amplitude of the tracking error signal is large (see the approximation line 1b). In procedure 3', the median value Vb of the value v1 and the value v2 is found, the focal position when the spherical aberration position is the median value Vb is found on the approximation line 1b, and the focal position and spherical aberration position at this point are termed the optimal servo position Pb.

The servo position setting component 117 need not perform the above-mentioned procedures 1, 2, and 2'. In this case, procedure 3 or 3' is performed using an approximation line that has been stored ahead of time.

The servo position setting component 117 may search for the point at which the amplitude of the tracking error signal becomes large while the spherical aberration position and the focal position are varied on the previously stored approximation line, without performing the above-mentioned procedures 1, 2, and 2'.

Also, the servo position setting component 117 may search for the focal position and the spherical aberration position without utilizing approximation lines. For instance, if the initial value of the focal position has been determined, a search is made for the spherical aberration position at which the tracking error signal value is at its maximum, in a state in which the focal position has been fixed at its initial value. Further, a search is made for the focal position at which the tracking error signal value is at its maximum, in a state in which the spherical aberration position has been fixed at its searched value. The result is that the focal position and spherical aberration position are determined as the optimal servo position.

A search in which the tracking error signal versus the focal position and the spherical aberration position is used as an evaluation index was described above, but it is similarly possible to perform searches including many other servo position parameters (such as the lens tilt position).

A test region for setting the optimal recording power is used in this embodiment as the region where first servo position adjustment is performed, but the present invention is not limited to this, and a region in which recording is not performed, for example, may be used instead. For instance, with a phase-change type of optical disc, the reflectivity in a recorded region is different from that in an unrecorded region, so the amplitude of the tracking error signal is also different.

Therefore, if a region that has been partially recorded is reproduced, there will be places where the amplitude of the tracking error signal is small, and processing such as selection by the computer 1004 of the maximum value of the obtained signal will be necessary, but if a region where no recording is performed is used, the amplitude of the tracking error signal will be stable, allowing the amplitude of the tracking error signal to be measured more simply.

The amplitude of the tracking error signal is detected in this embodiment to perform the first servo adjustment, but another signal may be detected instead.

Recording Step

Next, the recording of a predetermined signal is performed in a state in which the servo position is the one found in the first servo position adjustment. During recording, the peak power, bias power, and bottom power are set in the laser drive circuit 112 by the recording power setting component 111. The settings here may be carried by the optical disc 101, or, when a given optical disc has already been recorded to in the past, the recording power used at that time may be used again.

A signal 110 for continuously recording one time around the groove track from a predetermined position is then sent from the recording compensation circuit 109 to the laser drive circuit 112. In the second servo position adjustment (discussed below), recording of just one rotation is fine for focal position adjustment, but in the case of lens tilt position adjustment, it is preferable for the adjustment to include the effect of crosstalk from adjacent tracks, so the recording is continued for at least three rotations around the groove track. Also, the recorded signal is preferably a random signal according to a modulation rule.

Second Servo Position Adjustment Step Once recording is finished, second servo position adjustment is performed. The method for adjusting the second servo position will now be described. The semiconductor laser of the optical head 102 emits light at reproduction power, the track just recorded is reproduced, and a signal 103 that varies with whether or not there are recording marks on the optical disc 101 is inputted as a reproduction signal to the reproduction component B 104.

Figure 2:
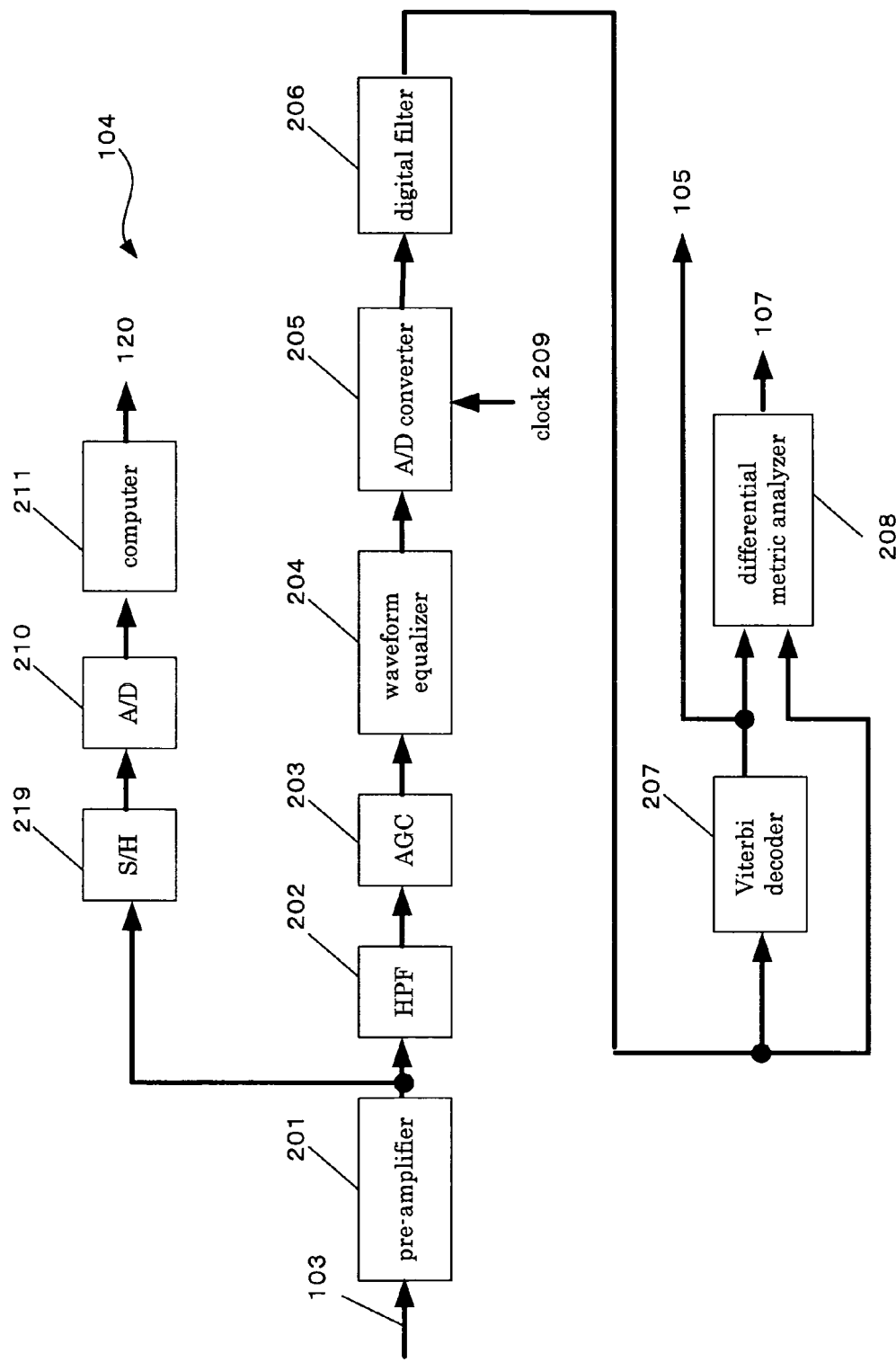
FIG. 2 is a block diagram of the reproduction component in an embodiment of the present invention.

FIG. 2 is a block diagram of the reproduction component B 104. In FIG. 2, 201 is a pre-amplifier, 202 is a bypass filter, 203 is an AGC circuit, 204 is a waveform equalizer, 205 is an A/D converter, 206 is a digital filter, 207 is a Viterbi decoder, and 208 is a differential metric analyzer. The signal 103 is amplified by the pre-amplifier 201 and AC-coupled with the bypass filter 202, after which it is inputted to the AGC 203. The AGC 203 adjusts the gain so that the output of the subsequent waveform equalizer 204 will be at a constant amplitude.

The reproduction signal outputted from the AGC 203 has its waveform shaped by the waveform equalizer 204. The reproduction signal whose waveform has thus been shaped is inputted to the A/D converter 205. The A/D converter 205 samples the reproduction signal with a clock 209. The clock 209 here is extracted by inputting the reproduction signal to a PLL (not shown). The reproduction signal sampled by the A/D converter 205 is inputted to the digital filter 206. The digital filter 206 has frequency characteristics such that the frequency characteristics of the recording and reproduction system are the characteristics assumed for the Viterbi decoder 207 (in this embodiment, PR (1, 2, 2, 1) equalization characteristics).

The Viterbi decoder 207 performs maximum likelihood decoding using the output data from the digital filter 206, and outputs binary data 105. The data outputted from the digital filter 206 and the binary data 105 outputted from the Viterbi decoder 207 are inputted to the differential metric analyzer 208. The differential metric analyzer 208 identifies state transition from the binary data of the Viterbi decoder 207. Furthermore, the differential metric analyzer 208 calculates the PRML error index M, which indicates the reliability of the decoding result, from the identification result and the data outputted from the digital filter 206. The output result 107 is inputted to the servo position setting component 117.

The servo position setting component 117 outputs the signal 118 for varying the focal position 1109 of the optical head 102. The servo position setting component 117 acquires the PRML error index M for every focal position, and determines the focal position at which the PRML error index M is at its minimum.

Similarly, the servo position setting component 117 outputs the signal 118 for varying the lens tilt position 1110 of the optical head 102. The servo position setting component 117 acquires the PRML error index M for every lens tilt position, and determines the lens tilt position at which the PRML error index M is at its minimum. The "lens tilt position" is the tilt of the objective lens 1107, and in particular is the amount of tilt for correcting tilt of the disc in the radial direction.

With a multilayer disc such as a BD, spherical aberration occurs when switching between layers, so the spherical aberration position has to be adjusted. Here again, the servo position setting component 117 outputs the signal 118 for changing the spherical aberration position 1111 of the optical head 102. The servo position setting component 117 acquires the PRML error index M at every focal position, and determines the spherical aberration position at which the PRML error index M is at its minimum.

The servo position setting component 117 performs adjustment of the above-mentioned focal position, lens tilt position, or spherical aberration position, or may perform any two of these adjustments, or all of them. Also, the adjustment of the servo position may involve adjusting the same type of servo position as that adjusted using the signal 116 outputted from the reproduction component A 115, or may involve adjusting a different kind of servo position.

In this embodiment, the way the spherical aberration position is changed is to change the position 1111 of the convex lens 1104 by using a spherical aberration position correction component constituted by the convex lens 1104 and the concave lens 1105, but the method for changing the spherical aberration position need not be limited to this.

Because the focal position and the spherical aberration position are in a mutually dependent relationship, the PRML error index M may be acquired while the focal position and spherical aberration position are dispersed in the form of a two-dimensional map, for example.

In this embodiment, the servo position is set so that the PRML error index M is at its minimum, but may instead be set in the middle of the servo position range in which the PRML error index M is at or below a predetermined value.

The search for the servo position using the PRML error index M as the evaluation index is the same as when the tracking error signal is used as the evaluation index (is the same as that described through reference to FIG. 13, for example), and will therefore not be described again.

Effect

In this embodiment, the servo position adjustment is performed in at least two stages: first servo position adjustment and second servo position adjustment. Also, the second servo position adjustment is performed by recording a predetermined signal after the first servo position adjustment and reproducing the track where the predetermined signal was recorded. As a result, even when recording to an optical disc in which no convex/concave pit string is present, individual variance between optical disc devices or optical discs can be absorbed and the correct servo adjustment position determined, and user data can be correctly recorded.

Figure 14:
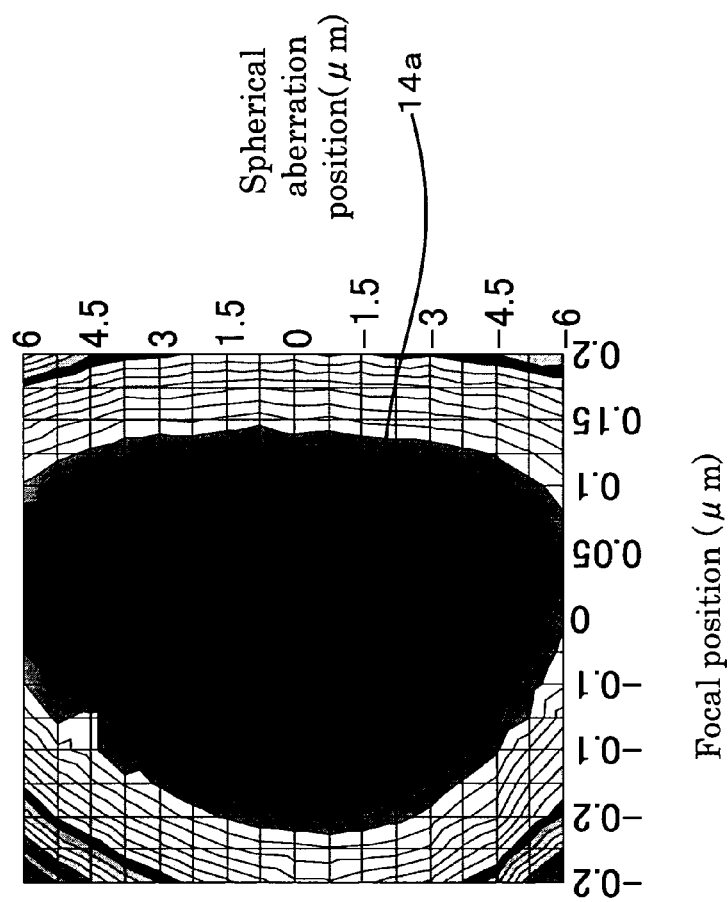
FIG. 14 is a graph of the distribution of PRML error index M values when the first servo position adjustment step is not performed.
Figure 15:
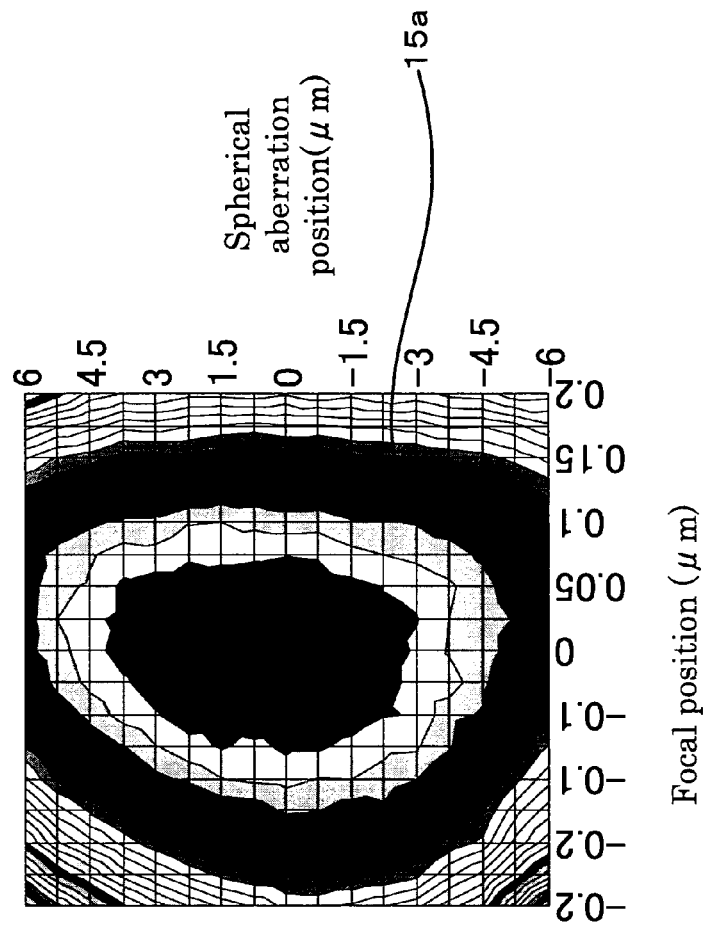
FIG. 15 is a graph of the distribution of PRML error index M values when the servo position adjustment method of the present invention is employed.

This will be described further through reference to FIGS. 14 and 15. FIGS. 14 and 15 are graphs of the distribution of PRML error index M versus the focal position and the spherical aberration position, shown by contours. Specifically, the PRML error index M is measured while the focal position and spherical aberration position are varied, and the distribution is shown by contours.

FIG. 14 is a graph of the distribution of PRML error index M values when just the second servo position adjustment was performed, that is, when the first servo position adjustment was not performed (see step S13a in FIG. 13). FIG. 15 is a graph of the distribution of PRML error index M values when the servo position adjustment method described in this embodiment was performed.

In FIGS. 14 and 15, the PRML error index M is at its minimum near the center of the graph, and the value of the PRML error index M increases toward the outer periphery of the graph. 14a in FIGS. 14 and 15a in FIG. 15 indicate the PRML error index M of the same value. Specifically, in FIG. 14, the value of the PRML error index M worsens overall, with the distribution becoming indistinct near the center. Accordingly, in FIG. 14, the position at which the PRML error index M is at its minimum is unclear. Research by the inventors of the present invention seems to indicate that this phenomenon is mainly attributable to inadequate test recording of the predetermined signal.

In FIG. 15, meanwhile, the PRML error index M has a distinct peak near the center of the graph. Specifically, since test recording is performed after the first servo position adjustment, test recording of the predetermined signal is suitably performed, and the second servo position adjustment that is performed by reproducing the recorded signal is also suitably performed. Thus, the correct servo position can be ascertained.

Also, with this embodiment, the first servo position adjustment is performed using a tracking error signal, and the second servo position adjustment is performed by reproducing a recorded track. The tracking error signal depends on the groove shape of the optical disc 101, and the rough servo position can be determined by acquiring a tracking error signal, but the optimal servo position for recording and reproducing signals is not necessarily obtained. Particularly when the objective lens of the optical head 102 has a large NA (Numerical Aperture) of about 0.85, as with a BD, a very slight deviation in servo position will greatly diminish signal quality, so determining the optimal servo position by reproducing a track where a signal has been recorded, as in the second servo position adjustment in this embodiment, is effective.

Also, performing the first servo position adjustment by using a tracking error signal, and performing the second servo position adjustment by reproducing a recorded track has the following effect. For example, when the servo position is adjusted by using the same evaluation index in both the first servo position adjustment and the second servo position adjustment, or more specifically, when servo position adjustment is performed at rough precision in the first servo position adjustment and is performed at fine precision in the second servo position adjustment, there is no guarantee that the servo position ultimately obtained will be a position suitable for the recording or reproduction of signals, and it is generally considered to be determined at a position away from the servo position that is optimal for the recording or reproduction of signals.

On the other hand, if the first servo position adjustment is performed by using a tracking error signal, and the second servo position adjustment is performed by reproducing a recorded track, as in this embodiment, the servo position that is ultimately obtained is a position at which the tracking servo is stable and which is suitable for the recording or reproduction of signals.

Performing the first servo position adjustment prevents the occurrence of tracking deviation or focus deviation during the second servo position adjustment or during the recording of a signal after the first servo position adjustment.

Also, determining the approximate range of the servo position by performing first servo position adjustment allows the range over which the second servo position adjustment will be performed to be identified, so the servo position can be adjusted in less time.

PRML

The PRML error index M will now be described. First, we will discuss the method for evaluating reproduction signal quality when maximum likelihood decoding is used. Maximum likelihood decoding is generally a decoding method in which reproduction patterns of a reproduction waveform are estimated beforehand, and the reproduction waveform and the estimated waveforms are compared while it is determined which pattern is closest. We will discuss here an example in which a minimum polarity inversion interval of 2 is used as the recording code. We will also describe a case in which waveform shaping is performed so that the frequency characteristics of the recording system and the frequency characteristics of the reproduction system are subjected to PR (1, 2, 2, 1) equalization together. We will let $b_k$ be the recording code [at the current time k], $b_{k-1}$ the recording code one unit time before [the current time], $b_{k-2}$ the recording code two unit times before [the current time], and $b_{k-3}$ the recording code before three unit times before [the current time]. If we let Level$_v$ be the ideal output value of PR (1, 2, 2, 1) equalization, then Level$_v$ is expressed by Mathematical Formula 1.

$$\text{Level}_v = b_{k-3} + 2b_{k-2} + 2b_{k-1} + b_k \quad \text{Mathematical Formula 1}$$

Here, k is an integer indicating time and v is an integer from 0 to 6.

Table 1 below is a state transition table, where a state at time k is represented by $S(b_{k-2}, b_{k-1}, b_k)$.

TABLE 1

State transition table determined from restrictions of a minimum inversion interval of 2 and PR (1, 2, 2, 1)

| State at time k − 1 $S(b_{k-3}, b_{k-2}, b_{k-1})$ | State at time k $S(b_{k-2}, b_{k-1}, b_k)$ | $B_k$/Level$_v$ |
|---|---|---|
| S(0, 0, 0) | S(0, 0, 0) | 0/0 |
| S(0, 0, 0) | S(0, 0, 1) | 1/1 |
| S(0, 0, 1) | S(0, 1, 1) | 1/3 |
| S(0, 1, 1) | S(1, 1, 0) | 0/4 |
| S(0, 1, 1) | S(1, 1, 1) | 1/5 |
| S(1, 0, 0) | S(0, 0, 0) | 0/1 |
| S(1, 0, 0) | S(0, 0, 1) | 1/2 |
| S(1, 1, 0) | S(1, 0, 0) | 0/3 |
| S(1, 1, 1) | S(1, 1, 0) | 0/5 |
| S(1, 1, 1) | S(1, 1, 1) | 1/6 |

Figure 3:
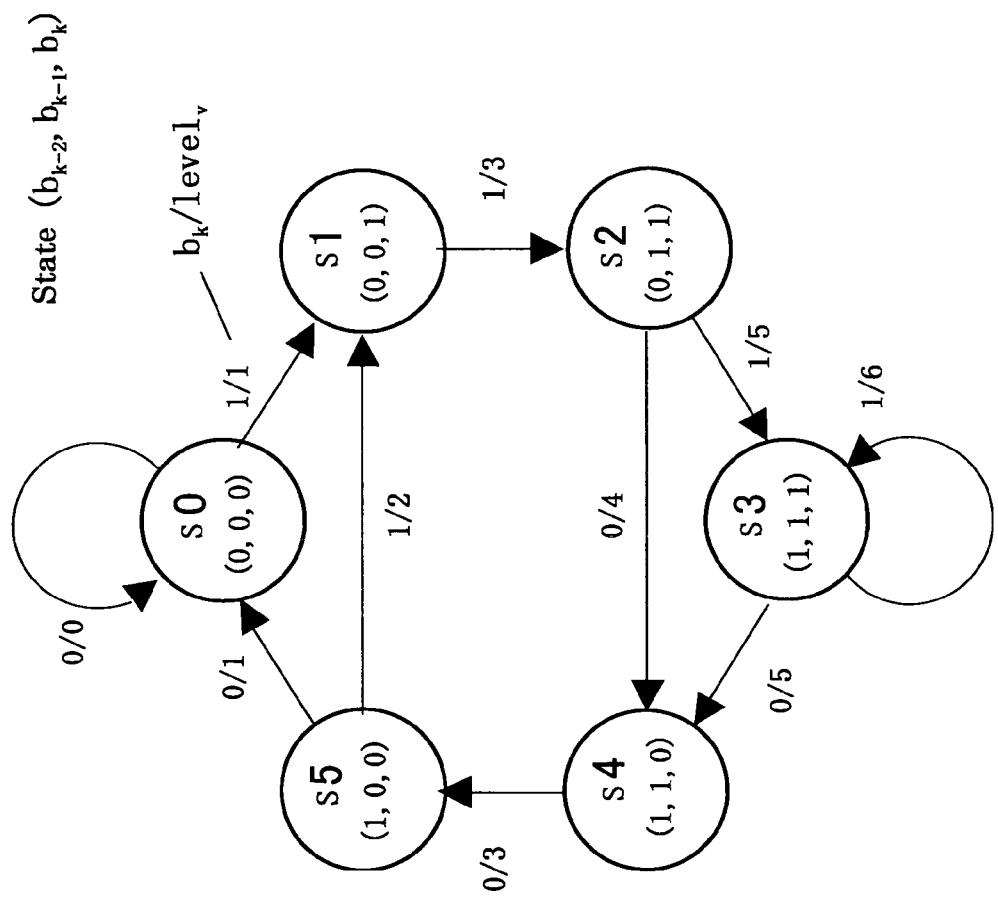
FIG. 3 is a state transition diagram in an embodiment of the present invention.
Figure 4:
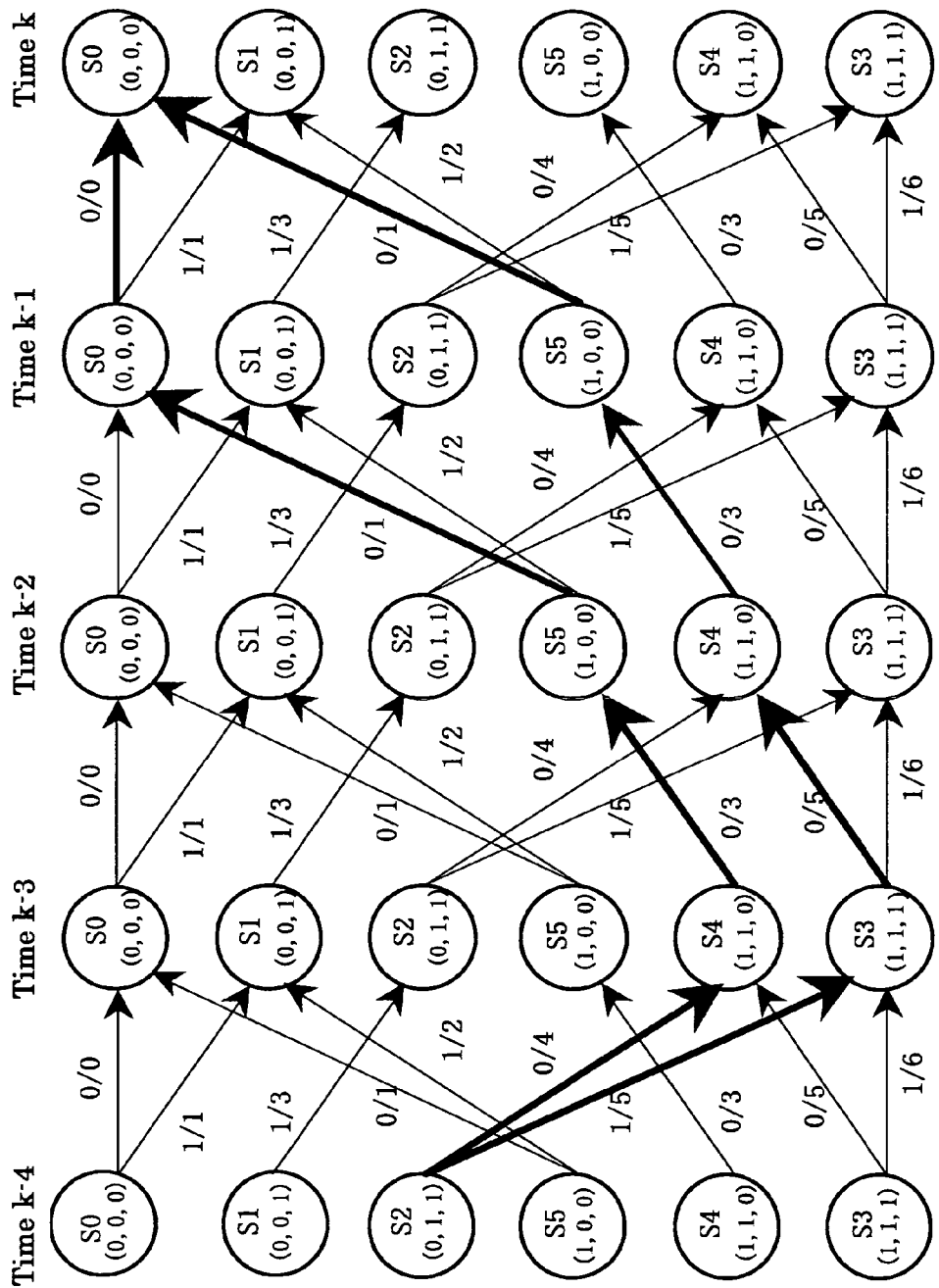
FIG. 4 is a trellis diagram in an embodiment of the present invention.

FIG. 3 is a state transition diagram in which a state S(0, 0, 0)$_k$ at time k is represented by S0$_k$, a state S(0, 0, 1)$_k$ is represented by S1$_k$, a state S(0, 1, 1)$_k$ is represented by S2$_k$, a state S(1, 1, 1)$_k$ is represented by S3$_k$, a state S(1, 1, 0)$_k$ is represented by S4$_k$, and a state S(1, 0, 0)$_k$ is represented by S5$_k$ for the sake of simplicity. The trellis diagram of FIG. 4 is obtained by extending this state transition diagram along the time axis. If we look at the state S0$_k$ at time k and the state S2$_{k-4 \text{ at time } k-4}$, we see there are two possible state transition sequences between the state S0$_k$ and the state S2$_{k-4}$. One of the possible state transition sequences is referred to as path A. The path A is a transition sequence of states S2$_{k-4}$, S4$_{k-3}$, S5$_{k-2}$, S$_{k-1}$, and S0$_k$. The other state transition sequence is referred to as path B. The path B is a transition sequence of states S2$_{k-4}$, S3$_{k-3}$, S4$_{k-2}$, S5$_{k-1}$, and S0$_k$. The results of maximum likelihood decoding from time k−6 to time k is represented by ($C_{k-6}, C_{k-5}, C_{k-4}, C_{k-3}, C_{k-2}, C_{k-1}, C_k$). In this case, when the decoding result ($C_{k-6}, C_{k-5}, C_{k-4}, C_{k-3}, C_{k-2}, C_{k-1}, C_k$) equals (0, 1, 1, x, 0, 0, 0) (where x is 0 or 1), it is estimated that the state transition sequence of either path A or path B is most likely. Since path A and path B have the same likelihood that a state at time k−4 is the state S2$_{k-4}$, by calculating sum of squares of the difference between the expected value and the value from a reproduced signal $Y_{k-3}$ to $Y_k$ on each of path A and path B from time k−3 to time k, it is determined whether the state transition sequence of path A or that of path B is most likely. If we let Pa be the sum of squares of the difference between the expected value and the value from a reproduced signal $Y_{k-3}$ to $Y_k$ on path A from time k−3 to time k, then Pa is expressed by the following Mathematical Formula 2, and if we let Pb be the sum of squares of the difference between the expected value and the value from a reproduced signal $y_{k-3}$ to $y_k$ on path B from time k−3 to time k, then Pb is expressed by the following Mathematical Formula 3.

$$Pa = (y_{k-3}-4)^2 + (y_{k-2}-3)^2 + (y_{k-1}-1)^2 + (y_k-0)^2 \quad \text{Mathematical Formula 2}$$

$$Pb = (y_{k-3}-5)^2 + (y_{k-2}-5)^2 + (y_{k-1}-3)^2 + (y_k-1)^2 \quad \text{Mathematical Formula 3}$$

Figure 5:
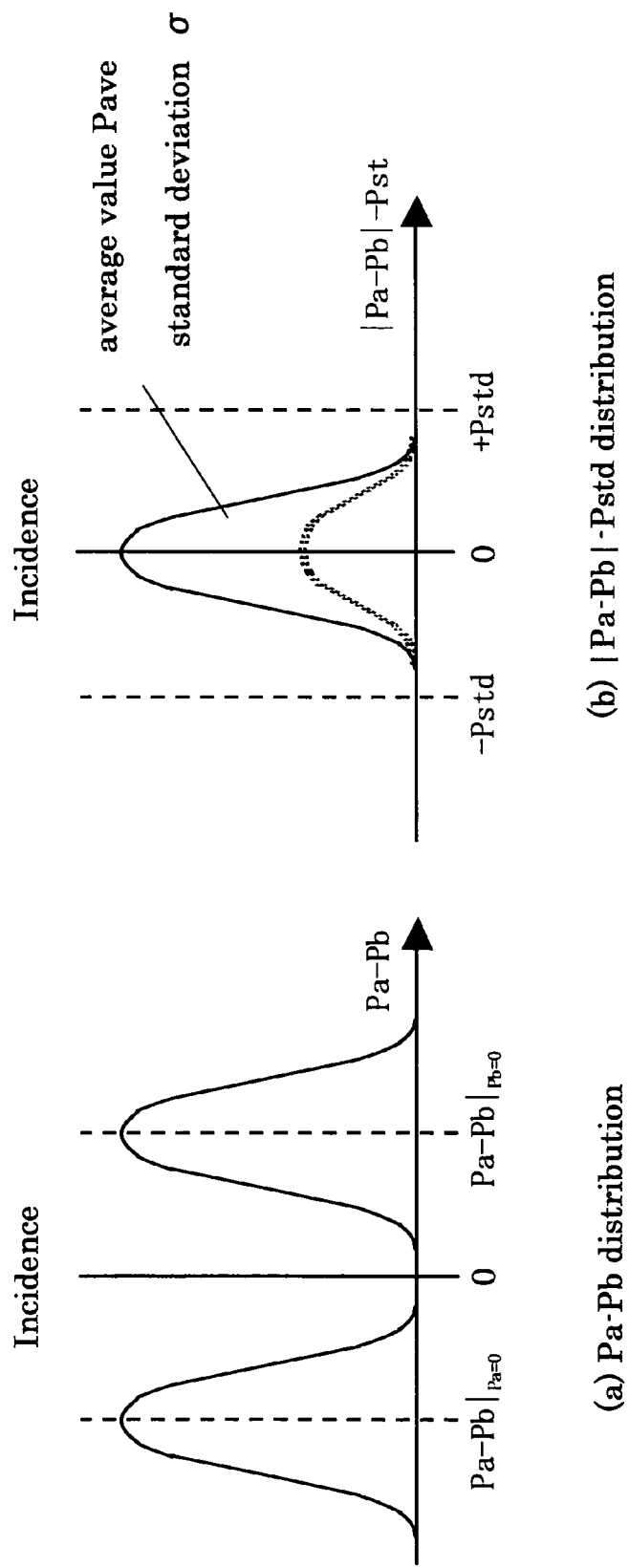
FIG. 5 consists of Pa–Pb distribution graphs of the reliability of the decoding effect.

The meaning of the difference Pa−Pb between Pa and Pb, which indicates the reliability of the decoding result, will now be described. A maximum likelihood decoding circuit selects path A with high confidence if Pa<<Pb, and path B if Pa>>Pb. If Pa=Pb, either path A or path B could conceivably be selected, and the decoding result would be true half the time. Thus, a distribution of Pa−Pb is obtained by finding Pa−Pb from a predetermined time or a predetermined number of iterations and the decoding result. FIG. 5 shows distributions of Pa−Pb.

FIG. 5a shows a distribution of Pa−Pb when noise is superimposed over a reproduction signal. The distribution has two peaks, one of which is the maximum incidence when Pa=0, and the other of which is the maximum incidence when Pb=0. We will let −Pstd be the value of Pa−Pb when Pa=0, and Pstd the value of Pa−Pb when Pb=0. The absolute value of Pa−Pb is taken and |Pa−Pb|−Pstd is found to obtain the distribution shown in FIG. 5b. The standard deviation σ and the average Pave of this distribution are found. If we assume this distribution to be a normal distribution, then the error probability P (σ, Pave), which is the probability that the reliability |Pa−Pb| of a decoding result will be equal to or less than −Pstd, for example, can be found from σ and Pave as shown in Mathematical Formula 4.

$$P(\sigma, \text{Pave}) = erfc((Pstd+\text{Pave})/\sigma) \quad \text{Mathematical Formula 4}$$

Therefore, the error rate of a binary result produced by maximum likelihood decoding can be predicted from the average Pave and the standard deviation σ of the distribution of Pa−Pb. In other words, the average Pave and the standard deviation σ can serve as indices of reproduction signal quality. The distribution of |Pa−Pb| was assumed to be a normal distribution in the above example, but if the distribution is not a normal distribution, the number of times that the value of |Pa−Pb|−Pstd is less than or equal to a predetermined reference value is counted, and the resulting count can be an index of signal quality.

In the case of the state transition rule defined by the recording code having a minimum polarity inversion interval of 2 and by PR (1, 2, 2, 1) equalization, the state makes a transition from one predetermined state to another predetermined state, and there are two possible combinations for the state transition sequence here: eight patterns from time k−4 to time k, and eight patterns from time k−5 to time k, but what is important here is that the reliability Pa−Pb serves as an index of reproduction signal quality, so if only patterns with a high probability of error are detected, these patterns can be used as an index that is correlated to the error rate, without having to detect all the patterns. The "patterns with a high probability of error" here are patterns with a low reliability Pa−Pb value, and are the eight patterns with which Pa−Pb=±10. Table 2 shows the results of finding Pa−Pb for these eight patterns.

TABLE 2

Combinations of the shortest state transitions in which there can be two transitions

| | Reliability of decoding result (Pa − Pb) | |
|---|---|---|
| State transition | Pa = 0 | Pb = 0 |
| S2$_{k-4}$ → S0$_k$ | −10 | +10 |
| S3$_{k-4}$ → S0$_k$ | −10 | +10 |
| S2$_{k-4}$ → S1$_k$ | −10 | +10 |
| S3$_{k-4}$ → S1$_k$ | −10 | +10 |
| S0$_{k-4}$ → S4$_k$ | −10 | +10 |
| S5$_{k-4}$ → S4$_k$ | −10 | +10 |
| S0$_{k-4}$ → S3$_k$ | −10 | +10 |
| S5$_{k-4}$ → S3$_k$ | −10 | +10 |

Mathematical Formula 5 shows the reliability Pa–Pb of the above-mentioned eight decoding results.

Pattern 1 when $(c_{k-6}, c_{k-5}, c_{k-4}, c_{k-3}, c_{k-2}, c_{k-1}, c_k) = (0, 1, 1, x, 0, 0, 0)$, $Pa-Pb = (E_{k-3} - F_{k-3}) + (D_{k-2} - F_{k-2}) + (B_{k-1} - D_{k-1}) + (A_k - B_k)$ Pattern 2 when $(c_{k-6}, c_{k-5}, c_{k-4}, c_{k-3}, c_{k-2}, c_{k-1}, c_k) = (1, 1, 1, x, 0, 0, 0)$, $Pa-Pb = (F_{k-3} - G_{k-3}) + (D_{k-2} - F_{k-2}) + (B_{k-1} - D_{k-1}) + (A_k - B_k)$ Pattern 3 when $(c_{k-6}, c_{k-5}, c_{k-4}, c_{k-3}, c_{k-2}, c_{k-1}, c_k) = (0, 1, 1, x, 0, 0, 1)$, $Pa-Pb = (E_{k-3} - F_{k-3}) + (D_{k-2} - F_{k-2}) + (B_{k-1} - D_{k-1}) + (B_k - c_k)$ Pattern 4 when $(c_{k-6}, c_{k-5}, c_{k-4}, c_{k-3}, c_{k-2}, c_{k-1}, c_k) = (1, 1, 1, x, 0, 0, 1)$, $Pa-Pb = (F_{k-3} - G_{k-3}) + (D_{k-2} - F_{k-2}) + (B_{k-1} - D_{k-1}) + (B_k - c_k)$ Pattern 5 when $(c_{k-6}, c_{k-5}, c_{k-4}, c_{k-3}, c_{k-2}, c_{k-1}, c_k) = (0, 0, 0, x, 1, 1, 0)$, $Pa-Pb = (A_{k-3} - B_{k-3}) + (B_{k-2} - D_{k-2}) + (D_{k-1} - F_{k-1}) + (E_k - F_k)$ Pattern 6 when $(c_{k-6}, c_{k-5}, c_{k-4}, c_{k-3}, c_{k-2}, c_{k-1}, c_k) = (1, 0, 0, x, 1, 1, 0)$, $Pa-Pb = (B_{k-3} - c_{k-3}) + (B_{k-2} - D_{k-2}) + (D_{k-1} - F_{k-1}) + (E_k - F_k)$ Pattern 7 when $(c_{k-6}, c_{k-5}, c_{k-4}, c_{k-3}, c_{k-2}, c_{k-1}, c_k) = (0, 0, 0, x, 1, 1, 1)$, $Pa-Pb = (A_{k-3} - B_{k-3}) + (B_{k-2} - D_{k-2}) + (D_{k-1} - F_{k-1}) + (F_k - G_k)$ Pattern 8 when $(c_{k-6}, c_{k-5}, c_{k-4}, c_{k-3}, c_{k-2}, c_{k-1}, c_k) = (1, 0, 0, x, 1, 1, 1)$, $Pa-Pb = (B_{k-3} - c_{k-3}) + (B_{k-2} - D_{k-2}) + (D_{k-1} - F_{k-1}) + (F_k - G_k)$   Mathematical Formulas 5

Here, $A_k = (y_k - 0)^2$, $B_k = (y_k - 1)^2$, $C_k = (y_k - 2)^2$, $D_k = (y_k - 3)^2$, $E_k = (y_k - 4)^2$, $F_k = (y_k - 5)^2$, and $G_k = (y_k - 6)^2$. Pa-Pb that satisfies Mathematical Formula 5 is found from the maximum likelihood decoding result $c_k$, and the standard deviation $\sigma_{10}$ and the average Pave$_{10}$ are found from the distribution thereof. If we assume a normal distribution, the probability $P_{10}$ at which each error will occur is expressed by Mathematical Formula 6.

$$P_{10}(\rho_{10}, Pave_{10}) = erfc(10 + Pave_{10}/\sigma_{10})$$   Mathematical Formula 6

These eight patterns are patterns in which a 1-bit shift error occurs, and the others are patterns in which a 2- or more bit shift error occurs. Analysis of post-PRML processing error patterns reveals that nearly all the errors are 1-bit shift errors, which means that the error probability of a reproduction signal can be estimated from Mathematical Formula 6, and the standard deviation $\sigma_{10}$ and the average value Pave$_{10}$ can be used as indices of the quality of the reproduction signal. For example, the above-mentioned index can be defined as the PRML error index M as follows.

$$M = (\sigma_{10}/2 \cdot d_{min}^2)[\%]$$   Mathematical Formulas 7

Here, $d_{min}^2$ is the square of the minimum value of a Euclidean distance, which is equal to 10 when the modulation code of this embodiment is combined with the PRML system. The average Pave$_{10}$ in Mathematical Formula 7 is assumed to be 0.

The PRML error index M is used in this embodiment, but any other index may be used instead, as long as it is based on Pa-Pb.

Further, a case in which PR (1, 2, 2, 2, 1) equalization is performed using a code in which the minimum polarity inversion interval is 2 as the recording code was described in this embodiment, but the present invention is not limited to this. For instance, the above example can be applied to a case in which the recording code has a minimum polarity inversion interval of 2, such as with (1, 7) modulation code, and in a case in which it has a minimum polarity inversion interval of 3, such as with 8-16 modulation code, which is used for DVD, the present invention can be worked by using a state transition rule in which six states are present in time k by PR (1, 2, 2, 1) equalization, and there are only eight possible state transitions to the six states at time k+1.

Therefore, the present invention can also be applied to a case in which a combination of a recording code having a minimum polarity inversion interval of 3 and PR (C0, C1, C1, C0) equalization is used, or a case in which a combination of a code having a minimum polarity inversion interval of 2 or 3 and PR (C0, C1, C0) equalization is used, or a case in which a combination of a code having a minimum polarity inversion interval of 2 or 3 and PR (C0, C1, C2, C1, C0) equalization is used. C0, C1, and C2 here are any positive number.

Furthermore, the PRML error index M is used in this embodiment as an index in performing the second servo position adjustment, but the index may instead be any other index obtained by reproduction of a signal, such as jitter or BER (Byte Error Rate).

Determining Recording Conditions by Learning

In this embodiment, the recording of a predetermined signal is performed in a state in which the servo position has been found by first servo position adjustment, but the recording conditions may be determined by performing test recording prior to the main recording.

If the recording is performed under recording conditions optimized by test recording, there will be an improvement in the quality of the signal recorded to the track where the second servo position adjustment is performed, and the second servo position adjustment can be carried out more accurately.

Examples of recording conditions include pulse position and irradiation power when a plurality of drive pulses are used to irradiate a track with a light beam. The operation involved in determining the optical waveform during recording will now be described.

Figure 8:
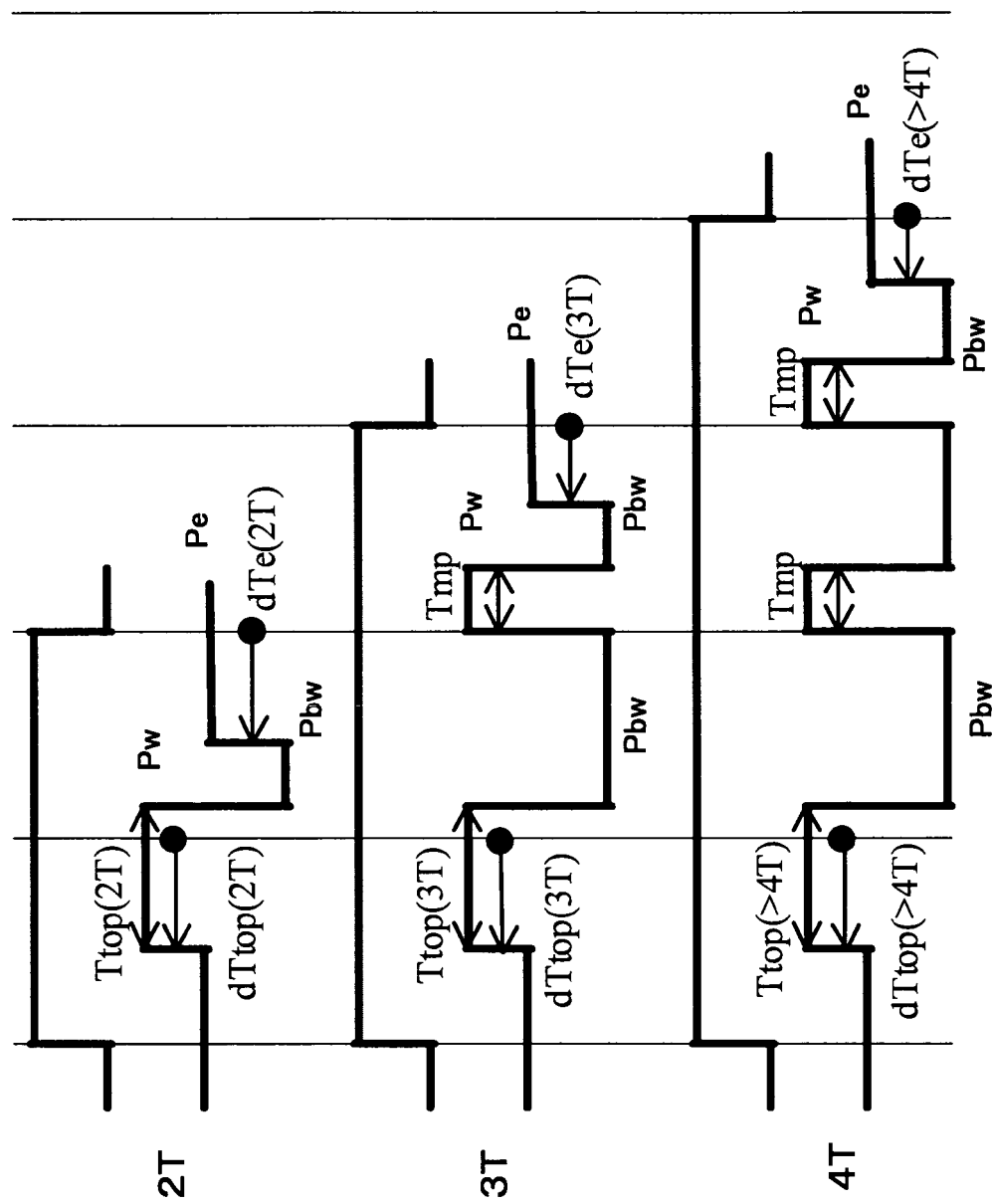
FIG. 8 is a diagram of optical pulse waveforms in an embodiment of the present invention.

FIG. 8 shows the optical waveform outputted from the optical head 102 during recording in this embodiment. In this embodiment, data of the run length limited (1, 7) modulation type is recorded by mark edge recording. In this case, there are seven types of marks and spaces for every T, which is a reference period from the shortest (2T) to the longest (8T). The recording method is not limited to this, however, and other recording methods may be used instead.

As shown in FIG. 8, irradiation power includes peak power (Pw), bias power (Pe), and bottom power (Pbw). Pulse positions include Ttop, dTtop, Tmp, and dTe. Recording of a 2T mark is performed with a single pulse, recording of a 3T mark is performed with two pulses, and the number of pulses increases by one each time the mark length increases by T. In this embodiment, all marks are applicable to peak power (Pw), bias power (Pe), and bottom power (Pbw), all marks are applicable to Tmp, and Ttop, dTtop, and dTe can be set in classifications of 2T, 3T, and 4T and higher, although the classification method is not limited to this. Parameters for determining the optical waveform are not limited to those in this embodiment.

Figure 9:
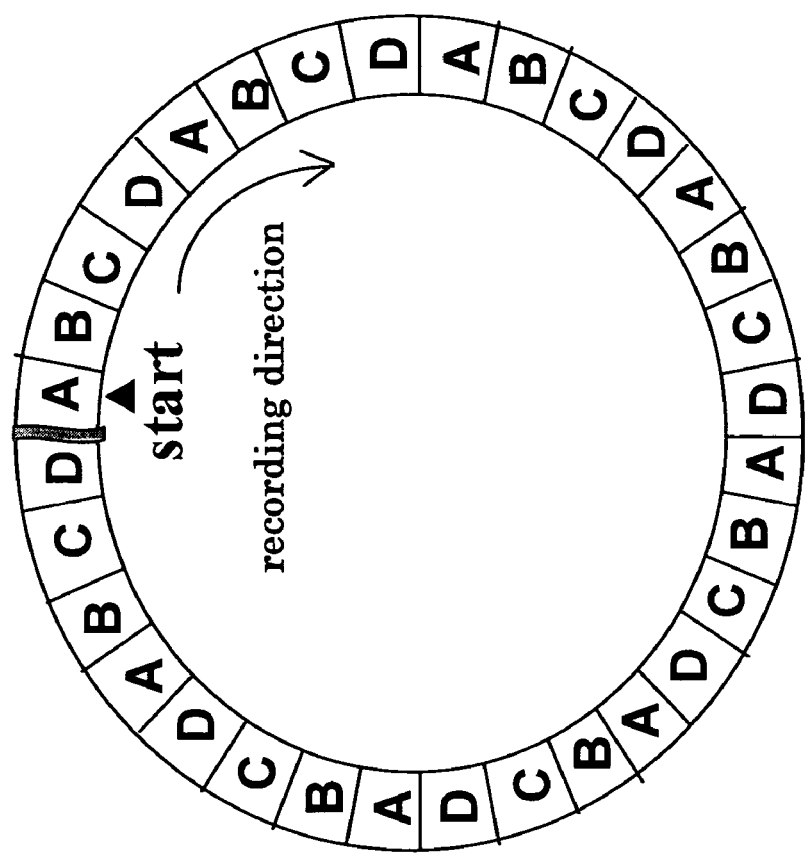
FIG. 9 is a diagram of the recording method in an embodiment of the present invention.

In determining the irradiation power, first the peak power, bias power, and bottom power are set in the laser drive circuit 112 by the recording power setting component 111. Then a signal 110 for continuously recording one groove track rotation from a predetermined position is sent from the recording compensation circuit 109 to the laser drive circuit 112. The recorded signal is a signal in which an 8T mark and an 8T space are contiguous, and recording is performed by varying the recording power between four conditions A, B, C, and D for one rotation, as shown in FIG. 9.

The ratio between peak power, bias power, and bottom power here is fixed. The four conditions can be repeated a plurality of times around one rotation to absorb tilt variance in the circumferential direction of the optical disc 101.

Once the recording is complete, the semiconductor laser of the optical head 102 emits light at reproduction power, and the track just recorded is reproduced. A signal 103 that varies with whether or not there are recording marks on the optical disc 101 is inputted as a reproduction signal to the reproduction component B 104. The signal 103 is amplified by the pre-amplifier 201, the peak and bottom values of the 8T signal are held by a sample/hold circuit 219, and peak and bottom values are converted into digital values by an A/D converter 210, the degree of modulation of the 8T signal, for example, is calculated by a computer 211, and a signal 120 is inputted to the recording and reproduction conditions determination component 108. The recording and reproduction conditions determination component 108 determines the optimal recording power on the basis of the degrees of modulation of A, B, C, and D.

In this embodiment, the degree of modulation of the reproduction signal was calculated by the computer 211, but amplitude or asymmetry may be used instead of the degree of modulation. Also, the irradiation power during recording was determined on the basis of the degree of modulation of an 8T single signal in this embodiment, but the method for determining the irradiation power is not limited to this, and the power may be determined on the basis of the PRML error index M, or the jitter or BER of a random signal.

Further, the ratio between peak power, bias power, and bottom power was fixed in this embodiment, but the peak power or the bias power or the bottom power may instead be determined independently. For instance, the bias power and bottom power may be fixed in determining the peak power, with each power determined individually.

In determining the pulse position, the determined peak power, bias power, and bottom power are set in the laser drive circuit 112 by the recording power setting component 111. A signal 110 for continuously recording one time around the groove track from a predetermined position is then sent from the recording compensation circuit 109 to the laser drive circuit 112. Further, the recorded signal is a random signal and recording is performed by varying the pulse position between four conditions A, B, C, and D, for example, for one rotation, as shown in FIG. 9. The four conditions can be repeated a plurality of times around one rotation to absorb tilt variance in the circumferential direction of the optical disc 101. The pulse position is changed, for example, by changing the dTe of a 3T signal four ways in 1 ns units.

Once the recording is complete, the semiconductor laser of the optical head 102 emits light at reproduction power, and the track just recorded is reproduced. A signal 103 that varies with whether or not there are recording marks on the optical disc 101 is inputted as a reproduction signal to the reproduction component B 104. In the reproduction component B 104, the signal 103 is amplified by the pre-amplifier 201 and AC-coupled with the bypass filter 202, after which it is inputted to the AGC 203. The AGC 203 adjusts the gain so that the output of the subsequent waveform equalizer 204 will be at a constant amplitude.

The reproduction signal outputted from the AGC 203 has its waveform shaped by the waveform equalizer 204. The reproduction signal whose waveform has thus been shaped is inputted to the A/D converter 205. The A/D converter 205 samples the reproduction signal with a clock 209. The clock 209 here is extracted by inputting the reproduction signal to a PLL (not shown). The reproduction signal sampled by the A/D converter 205 is inputted to the digital filter 206. The digital filter 206 has frequency characteristics such that the frequency characteristics of the recording and reproduction system are the characteristics assumed for the Viterbi decoder 207 (in this embodiment, PR (1, 2, 2, 1) equalization characteristics).

The Viterbi decoder 207 performs maximum likelihood decoding using the output data from the digital filter 206, and outputs binary data 105. The data outputted from the digital filter 206 and the binary data 105 outputted from the Viterbi decoder 207 are inputted to the differential metric analyzer 208. The differential metric analyzer 208 identifies state transition from the binary data of the Viterbi decoder 207. Furthermore, the differential metric analyzer 208 calculates the PRML error index M (Mathematical Formula 7), which indicates the reliability of the decoding result, from the identification result and the data outputted from the digital filter 206. The output result 107 is inputted to the recording and reproduction conditions determination component 108.

What is obtained here is a value for M averaged for each of the conditions A, B, C, and D, and the conditions under which the PRML error index M is smallest are determined as the dTe pulse position conditions for subsequent 3T signals. Thereafter, the pulse positions are similarly determined in the order of the Ttop of a 3T signal, the dTtop of a 3T signal, the dTe of a 2T signal, the Ttop of a 2T signal, and the dTtop of a 2T signal.

In this embodiment, the pulse positions are determined on the basis of the PRML error index M of random signals, but the method for determining pulse positions is not limited to this, and the pulse positions may instead be determined on the basis of the BER or jitter of random signals.

As discussed above, servo position adjustment is performed in at least two stages: first servo position adjustment and second servo position adjustment. Also, the second servo position adjustment is performed by recording a predetermined signal after the first servo position adjustment and then reproducing the track where the predetermined signal was recorded. As a result, even when recording to or reproducing from an optical disc in which no convex/concave pit string is present, individual variance between optical disc devices or optical discs can be absorbed and the correct servo adjustment position determined, and user data can be correctly recorded or reproduced.

Particularly when the objective lens of the optical head 102 has a large NA (Numerical Aperture) of about 0.85, as with a BD, a very slight deviation in servo position will greatly diminish signal quality, so performing servo position adjustment twice as in this embodiment is very effective.

Furthermore, in this embodiment, the recording conditions are determined by performing test recording prior to the main recording in the course of recording a predetermined signal.

This makes it possible to perform servo position adjustment by reproducing a recorded signal more favorably in the second servo position adjustment in which servo position adjustment is performed by reproducing a recorded track. Accordingly, the servo position can be adjusted more favorably.

An optical disc in which no convex/concave pit string is present was described in this embodiment, but the present invention can also be applied to an optical disc in which a convex/concave pit string is present. Specifically, the first servo position adjustment is performed using a track with no convex/concave pits, recording is performed after the first servo position adjustment, and then the second servo position adjustment is performed. Another option is to perform the first servo position adjustment using convex/concave pits, and then perform recording after the first servo position adjustment and the second servo position adjustment.

Also, test recording may be performed again after the servo position adjustment has been performed twice as in this embodiment, and the irradiation power, pulse position, and other such recording conditions may be determined in the course of irradiating a track with a light beam using a plurality of drive pulses. This makes it possible to determine the recording conditions at a more correct servo position, and allows user data to be recorded more accurately.

Other

In the device described through reference to the drawings in the above embodiment, the various function blocks may be in the form of individual chips by using an LSI chip or other such semiconductor device, or single chips may be designed to include some or all of the function blocks.

More specifically, a servo position adjustment device may be formed such that the reproduction component A 115, the reproduction component B 104, the recording and reproduction conditions determination component 108, the recording power setting component 111, and the servo position setting component 117 in FIG. 1 are made into a single chip. Further, the first servo position adjustment unit is formed by the reproduction component A 115 and the servo position setting component 117. A recording unit for performing the recording of a predetermined signal after first servo position adjustment is formed by the recording and reproduction conditions determination component 108 and the recording power setting component 111. A second servo position adjustment unit for performing second servo position adjustment by reproducing a track in which the predetermined signal has been recorded is formed by the reproduction component B 104 and the servo position setting component 117.

The term LSI was used above, but depending on the degree of integration, this is also sometimes referred to as an IC, system LSI, super-LSI, or ultra-LSI.

The method for producing an integrated circuit is not limited to an LSI, and a dedicated circuit or a multipurpose processor may be used instead. After LSI manufacture, an FPGA (Field Programmable Gate Array), or a reconfigurable processor that allows reconfiguration of circuit cell connections and settings within an LSI, may be utilized.

Furthermore, if advances in or derivations of semiconductor technology should create some new integrated circuit technology that supplants LSI, naturally, that technology may be used to integrate the function blocks. The application of biotechnology or the like is also feasible.

INDUSTRIAL APPLICABILITY

The method of the present invention for recording optical information is useful in high-density recording to an optical disc.

What is claimed is:

1. A servo position adjustment method for recording to an information recording medium in which a plurality of tracks are formed concentrically or spirally and the recording side of the tracks is irradiated with an optical beam to record user data, said method comprising:
    a first servo position adjustment step;
    a recording step of recording a predetermined signal in a servo position found in the first servo position adjustment;
    a reproduction step of reproducing the predetermined signal recorded in said recording step; and
    a second servo position adjustment step of performing a second servo position adjustment based on the reproduction of the predetermined signal.

2. The servo position adjustment method according to claim 1,
    wherein said first servo position adjustment step comprises adjusting a servo position on a basis of a first evaluation index, and
    wherein said second servo position adjustment step comprises adjusting a servo position on the basis of a second evaluation index.

3. The servo position adjustment method according to claim 2,
    wherein the basis for adjusting a servo position in said first servo position adjustment step is to optimize the first evaluation index with respect to tracking error.

4. The servo position adjustment method according to claim 2,
    wherein the basis for adjusting a servo position in said second servo position adjustment step is to optimize the second evaluation index with respect to a reproduction signal in a predetermined reproduction signal processing method.

5. The servo position adjustment method according to claim 4,
    wherein the second evaluation index is a PRML error index M, and
    wherein optimizing the second evaluation index comprises minimizing the PRML error index M.

6. The servo position adjustment method according to claim 1,
    wherein at least one of adjustments of focal position, lens tilt position, and spherical aberration position is performed in said first servo position adjustment step or said second servo position adjustment step.

7. The servo position adjustment method according to claim 1,
    wherein recording conditions in said recording step are determined by test recording.

8. The servo position adjustment method according to claim 7,
    wherein the recording conditions include conditions for pulse position and/or laser irradiation power in recording the predetermined signal.

9. A servo position adjustment device for adjusting a servo position in the course of recording to an information recording medium in which a plurality of tracks are formed concentrically or spirally and the recording side of the tracks is irradiated with an optical beam to record user data, said device comprising:
    a first servo position adjustment unit operable to perform a first servo position adjustment;
    a recording unit operable to record a predetermined signal in a servo position found in the first servo position adjustment; and
    a second servo position adjustment unit operable to reproduce the predetermined signal recorded by said recording unit and to perform a second servo position adjustment based on the reproduction of the predetermined signal.

* * * * *